United States Patent
Manolakos et al.

(10) Patent No.: US 12,526,110 B2
(45) Date of Patent: Jan. 13, 2026

(54) PROCESSING NON-CONTIGUOUS STITCHED POSITIONING REFERENCE SIGNALS

(71) Applicant: QUALCOMM Incorporated, San Diego, CA (US)

(72) Inventors: Alexandros Manolakos, Escondido, CA (US); Mukesh Kumar, Hyderabad (IN); Guttorm Ringstad Opshaug, Redwood City, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 458 days.

(21) Appl. No.: 18/006,747

(22) PCT Filed: Sep. 1, 2021

(86) PCT No.: PCT/US2021/048687
§ 371 (c)(1),
(2) Date: Jan. 25, 2023

(87) PCT Pub. No.: WO2022/072111
PCT Pub. Date: Apr. 7, 2022

(65) Prior Publication Data
US 2023/0269049 A1      Aug. 24, 2023

(30) Foreign Application Priority Data
Sep. 29, 2020   (IN) .............................. 202041042220

(51) Int. Cl.
H04L 5/00          (2006.01)
(52) U.S. Cl.
CPC .......... H04L 5/0051 (2013.01); H04L 5/0041 (2013.01)

(58) Field of Classification Search
CPC . H04W 24/10; H04W 64/003; H04W 5/0051; H04W 5/0041
See application file for complete search history.

(56) References Cited

U.S. PATENT DOCUMENTS

2019/0101615 A1*   4/2019   Tenny ..................... G01S 5/10

FOREIGN PATENT DOCUMENTS

| WO | 2016122757 A1 | 8/2016 |
| WO | 2018093835 A1 | 5/2018 |
| WO | 2019214746 A1 | 11/2019 |

OTHER PUBLICATIONS

International Search Report and Written Opinion—PCT/US2021/048687—ISA/EPO—Jan. 7, 2022.
(Continued)

Primary Examiner — Shukri Taha
(74) Attorney, Agent, or Firm — SUNSTEIN LLP

(57) ABSTRACT

Techniques are provided for processing frequency domain non-contiguous positioning reference signals. An example method for determining a time of arrival of a frequency domain non-contiguous positioning reference signal includes receiving the frequency domain non-contiguous positioning reference signal, determining a first estimate of the time of arrival (1204) based on a narrowband processing of the frequency domain non-contiguous positioning reference signal, performing a wideband processing of the frequency domain non-contiguous positioning reference signal based on the first estimate of the time of arrival, and determining a second estimate of the time of arrival (1214) based on the first estimate of the time of arrival and the wideband processing of the frequency domain non-contiguous positioning reference signal.

28 Claims, 15 Drawing Sheets

(56) References Cited

OTHER PUBLICATIONS

European Search Report—EP23215334—Search Authority—Munich—Mar. 11, 2024.

* cited by examiner

PROCESSING NON-CONTIGUOUS STITCHED POSITIONING REFERENCE SIGNALS

CROSS-REFERENCE TO RELATED APPLICATIONS

This application is the National Stage of International Application No. PCT/US2021/048687, filed Sep. 1, 2021, entitled "PROCESSING NON-CONTIGUOUS STITCHED POSITIONING REFERENCE SIGNALS," which claims the benefit of Indian Patent Application number 202041042220, filed Sep. 29, 2020, entitled "PROCESSING NON-CONTIGUOUS STITCHED POSITIONING REFERENCE SIGNALS," both of which is are assigned to the assignee hereof, and the entire contents of both of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points. Stations in a wireless network may be configured to transmit reference signals to enable mobile device to perform positioning measurements. Improvements in position related signaling may improve the efficiency of mobile devices.

SUMMARY

An example method for determining a time of arrival of a frequency domain non-contiguous positioning reference signal according to the disclosure includes receiving the frequency domain non-contiguous positioning reference signal, determining a first estimate of the time of arrival based on a narrowband processing of the frequency domain non-contiguous positioning reference signal, performing a wideband processing of the frequency domain non-contiguous positioning reference signal based on the first estimate of the time of arrival, and determining a second estimate of the time of arrival based on the first estimate of the time of arrival and the wideband processing of the frequency domain non-contiguous positioning reference signal.

Implementations of such a method may include one or more of the following features. The frequency domain non-contiguous positioning reference signal may include two or more positioning reference signal resources of two separate positioning frequency layers. A gap in the frequency domain non-contiguous positioning reference signal may be based on a guard band between two positioning frequency layers. A gap in the frequency domain non-contiguous positioning reference signal may be due to collisions caused by signals on other channels. The wideband processing may include setting a plurality of received frequency domain resources in a gap in the frequency domain non-contiguous positioning reference signal to a value of zero. The first estimate of the time of arrival may be transmitted to a network entity. The second estimate of the time of arrival may be transmitted to a network entity. A gap in the frequency domain non-contiguous positioning reference signal may be greater than a threshold percentage of a total bandwidth of the frequency domain non-contiguous positioning reference signal. The threshold percentage may be five percent. A gap in the frequency domain non-contiguous positioning reference signal may be greater than a threshold number of resource blocks. The threshold number of resource blocks may be 10 resource blocks.

An example method of determining a time of arrival of a frequency domain non-contiguous positioning reference signal according to the disclosure includes receiving the frequency domain non-contiguous positioning reference signal, determining a bandwidth gap length of the frequency domain non-contiguous positioning reference signal, performing a first time of arrival computation if the bandwidth gap length is less than a threshold value, and performing a second time of arrival computation if the bandwidth gap length is greater than or equal to the threshold value.

Implementations of such a method may include one or more of the following features. The first time of arrival computation may comprise a narrowband processing of the frequency domain non-contiguous positioning reference signal. The narrowband processing may include performing one or more Inverse Fast Fourier Transforms on at least a portion of the frequency domain non-contiguous positioning reference signal. The second time of arrival computation may comprise a narrowband processing and a wideband processing of the frequency domain non-contiguous positioning reference signal. The wideband processing may comprise setting a plurality of received frequency domain resources in a gap in the frequency domain non-contiguous positioning reference signal to a value of zero and performing an Inverse Fast Fourier Transform on the frequency domain non-contiguous positioning reference signal including the gap. A first estimated time of arrival value and a second estimated time of arrival value may be sent to a network entity. The threshold value may be 5% of a total bandwidth of the frequency domain non-contiguous positioning reference signal. The threshold value may be 10 resource blocks. The frequency domain non-contiguous positioning reference signal may include two or more positioning reference signal resources of two separate positioning frequency layers.

An example apparatus according to the disclosure includes a memory, at least one transceiver, at least one processor communicatively coupled to the memory and the at least one transceiver and configured to receive a frequency domain non-contiguous positioning reference signal, determine a first estimate of a time of arrival based on a narrowband processing of the frequency domain non-contiguous positioning reference signal, perform a wideband processing of the frequency domain non-contiguous positioning reference signal based on the first estimate of the time of arrival, and determine a second estimate of the time of arrival based on the first estimate of the time of arrival and the wideband processing of the frequency domain non-contiguous positioning reference signal.

Implementations of such an apparatus may include one or more of the following features. The frequency domain non-contiguous positioning reference signal may include two or more positioning reference signal resources of two separate positioning frequency layers. A gap in the frequency domain non-contiguous positioning reference signal may be based on a guard band between two positioning frequency layers. A gap in the frequency domain non-contiguous positioning reference signal may be due to collisions caused by signals on other channels. The at least one processor may be further configured to perform the wideband processing by setting a plurality of received frequency domain resources in a gap in the frequency domain non-contiguous positioning reference signal to a value of zero. The at least one processor may be further configured to transmit the first estimate of the time of arrival to a network entity. The at least one processor may be further configured to transmit the second estimate of the time of arrival to a network entity. A gap in the frequency domain non-contiguous positioning reference signal may be greater than a threshold percentage of a total bandwidth of the frequency domain non-contiguous positioning reference signal. The threshold percentage may be five percent. A gap in the frequency domain non-contiguous positioning reference signal may be greater than a threshold number of resource blocks. The threshold number of resource blocks may be 10 resource blocks.

An example apparatus according to the disclosure includes a memory, at least one transceiver, at least one processor communicatively coupled to the memory and the at least one transceiver and configured to receive a frequency domain non-contiguous positioning reference signal, determine a bandwidth gap length of the frequency domain non-contiguous positioning reference signal, perform a first time of arrival computation if the bandwidth gap length is less than a threshold value, and perform a second time of arrival computation if the bandwidth gap length is greater than or equal to the threshold value.

Implementations of such an apparatus may include one or more of the following features. The first time of arrival computation may comprise a narrowband processing of the frequency domain non-contiguous positioning reference signal. The narrowband processing may include performing one or more Inverse Fast Fourier Transforms on at least a portion of the frequency domain non-contiguous positioning reference signal. The second time of arrival computation may comprise a narrowband processing and a wideband processing of the frequency domain non-contiguous positioning reference signal. The wideband processing may comprise setting a plurality of received frequency domain resources in a gap in the frequency domain non-contiguous positioning reference signal to a value of zero and performing an Inverse Fast Fourier Transform on the frequency domain non-contiguous positioning reference signal including the gap. The at least one processor may be further configured to send a first estimated time of arrival value and a second estimated time of arrival value to a network entity. The threshold value may be 5% of a total bandwidth of the frequency domain non-contiguous positioning reference signal. The threshold value may be 10 resource blocks. The frequency domain non-contiguous positioning reference signal may include two or more positioning reference signal resources of two separate positioning frequency layers.

An example apparatus for determining a time of arrival of a frequency domain non-contiguous positioning reference signal according to the disclosure includes means for receiving the frequency domain non-contiguous positioning reference signal, means for determining a first estimate of the time of arrival based on a narrowband processing of the frequency domain non-contiguous positioning reference signal, means for performing a wideband processing of the frequency domain non-contiguous positioning reference signal based on the first estimate of the time of arrival, and means for determining a second estimate of the time of arrival based on the first estimate of the time of arrival and the wideband processing of the frequency domain non-contiguous positioning reference signal.

An example apparatus for determining a time of arrival of a frequency domain non-contiguous positioning reference signal according to the disclosure includes means for receiving the frequency domain non-contiguous positioning reference signal, means for determining a bandwidth gap length of the frequency domain non-contiguous positioning reference signal, means for performing a first time of arrival computation if the bandwidth gap length is less than a threshold value, and means for performing a second time of arrival computation if the bandwidth gap length is greater than or equal to the threshold value.

An example non-transitory processor-readable storage medium comprising processor-readable instructions configured to cause one or more processors to determine a time of arrival of a frequency domain non-contiguous positioning reference signal according to the disclosure includes code for receiving the frequency domain non-contiguous positioning reference signal, code for determining a first estimate of the time of arrival based on a narrowband processing of the frequency domain non-contiguous positioning reference signal, code for performing a wideband processing of the frequency domain non-contiguous positioning reference signal based on the first estimate of the time of arrival, and code for determining a second estimate of the time of arrival based on the first estimate of the time of arrival and the wideband processing of the frequency domain non-contiguous positioning reference signal.

An example non-transitory processor-readable storage medium comprising processor-readable instructions configured to cause one or more processors to determine a time of arrival of a frequency domain non-contiguous positioning reference signal according to the disclosure includes code for receiving the frequency domain non-contiguous positioning reference signal, code for determining a bandwidth gap length of the frequency domain non-contiguous positioning reference signal, code for performing a first time of arrival computation if the bandwidth gap length is less than a threshold value, and code for performing a second time of arrival computation if the bandwidth gap length is greater than or equal to the threshold value.

Items and/or techniques described herein may provide one or more of the following capabilities, as well as other capabilities not mentioned. A user equipment may receive a non-contiguous positioning reference signal. An estimated time of arrival may be determined based on a narrowband processing of the edges of the non-contiguous reference signal. A wideband processing may be performed on the entire bandwidth of the non-contiguous positioning reference signal. A time of arrival may be determine based on the estimated time of arrival and the wideband processing. The estimated time of arrival and the time of arrival may be provided to a network server. The accuracy of the time of arrival may be improved. Other capabilities may be provided and not every implementation according to the disclosure must provide any, let alone all, of the capabilities discussed.

DETAILED DESCRIPTION

Techniques are discussed herein for processing frequency domain non-contiguous positioning reference signals. Positioning reference signals (PRSs) may be configured to span across component carriers (CC). The component carriers may be contiguous or non-contiguous. PRSs in contiguous component carriers may be punctured by other downlink transmissions, uplink transmissions, band gaps and/or other guard frequencies. A user equipment (UE) receiving the PRS may be configured to perform a narrowband processing on the edges of the resulting non-contiguous resources in the PRS. The narrowband processing may include performing two Inverse Fast Fourier Transforms (IFFT) on the edges of the bands and then adding the corresponding channel energy responses (CERs) to determine a combined CER. An estimated time of arrival may be determined based on the narrowband processing. The estimated time of arrival may be provided to a network server. The UE may be configured to set the frequency values in the bandwidth gap between the non-contiguous resources in the PRS to zero in the frequency domain prior to performing a wideband processing of the PRS. The wideband processing may include performing an IFFT on the PRS including the non-contiguous resources and the zeroed out gap. The time of arrival estimate may be fine-tuned based on the wideband processing. The UE may be configured to provide the fine-tuned time of arrival to the network server. These techniques and configurations are examples, and other techniques and configurations may be used.

Figure 1:
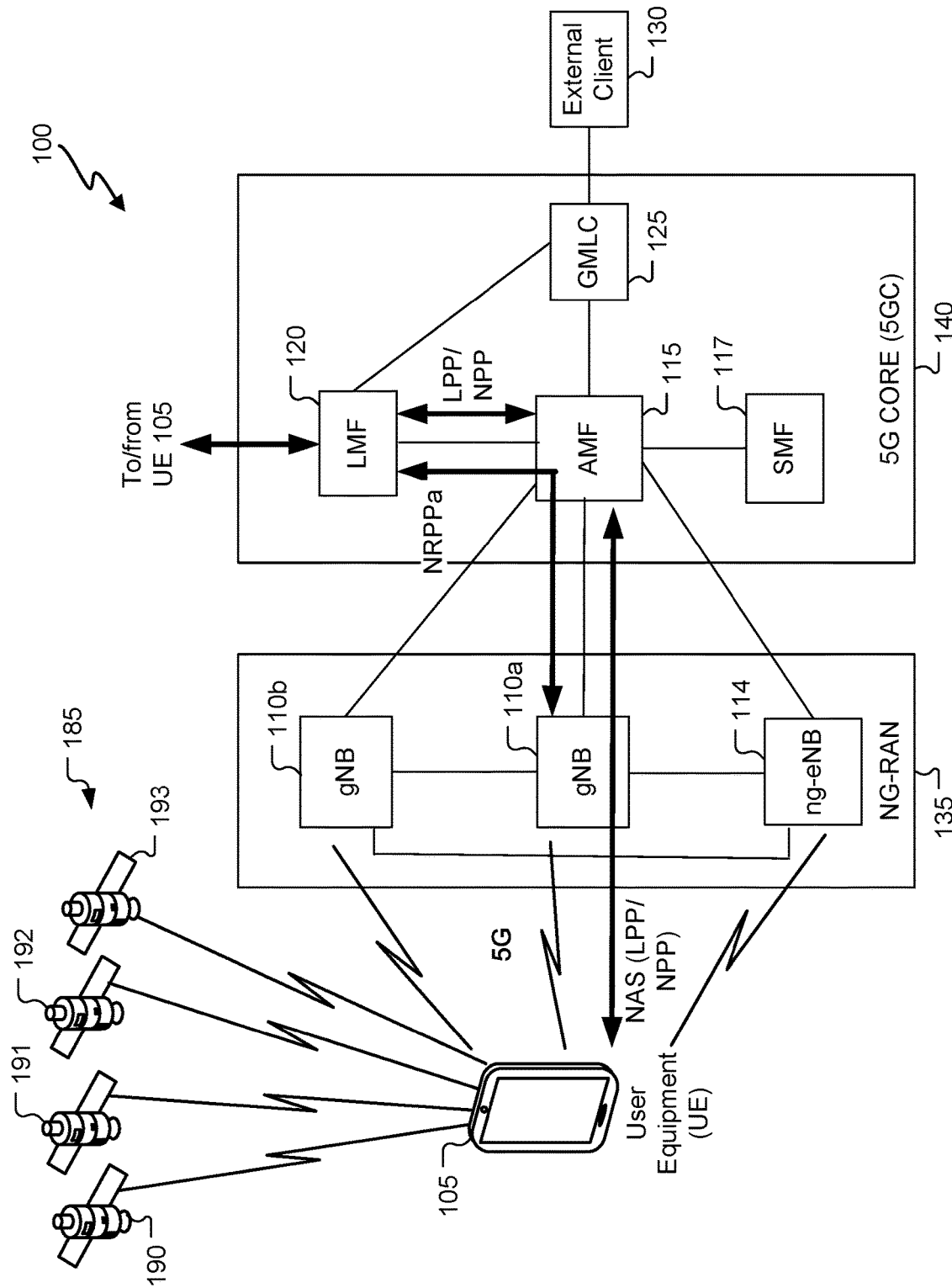
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs, such as the gNB 110a, the gNB 110b, the ng-eNB 114, may each comprise one or more TRPs. For example, each sector within a cell of a BS may comprise a TRP, although multiple TRPs may share one or more components (e.g., share a processor but have separate antennas). The communication system 100 may include macro TRPs or the communication system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
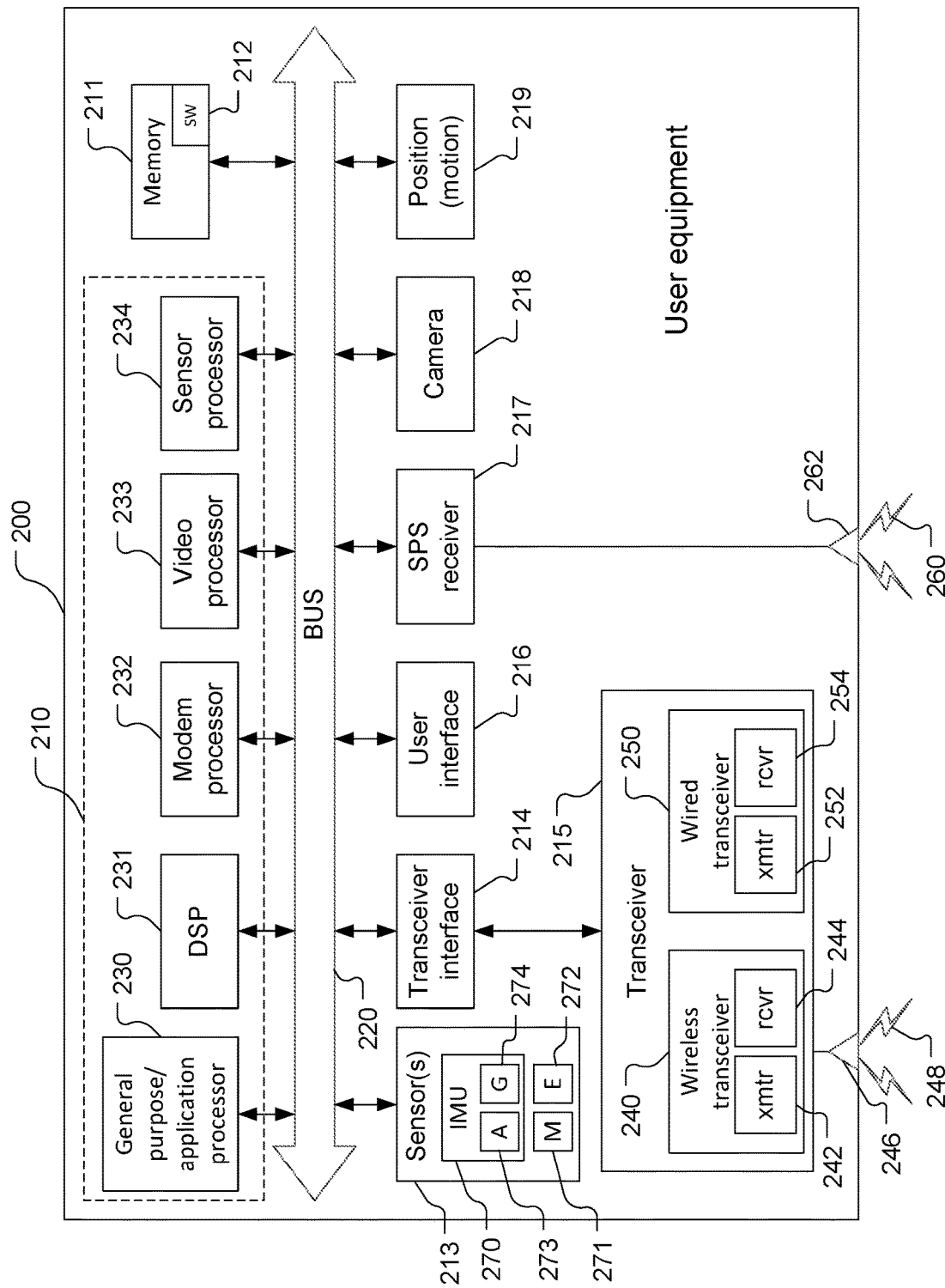
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing (with one or more wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-Vehicle-to-Everything (V2X) (PC5), V2C (Uu), IEEE 802.11 (including IEEE 802.11p), WiFi, WiFi Direct (WiFi-D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6 GHz and/or 100 GHz and higher (e.g., FR2x, FR3, FR4). The wired transceiver 250 may include a transmitter 252 and a receiver 254 configured for wired communication, e.g., with the NG-RAN 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the wireless signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion. In an example the PMD 219 may be referred to as a Positioning Engine (PE), and may be performed by the general-purpose processor 230. For example, the PMD 219 may be a logical entity and may be integrated with the general-purpose processor 230 and the memory 211.

Figure 3:
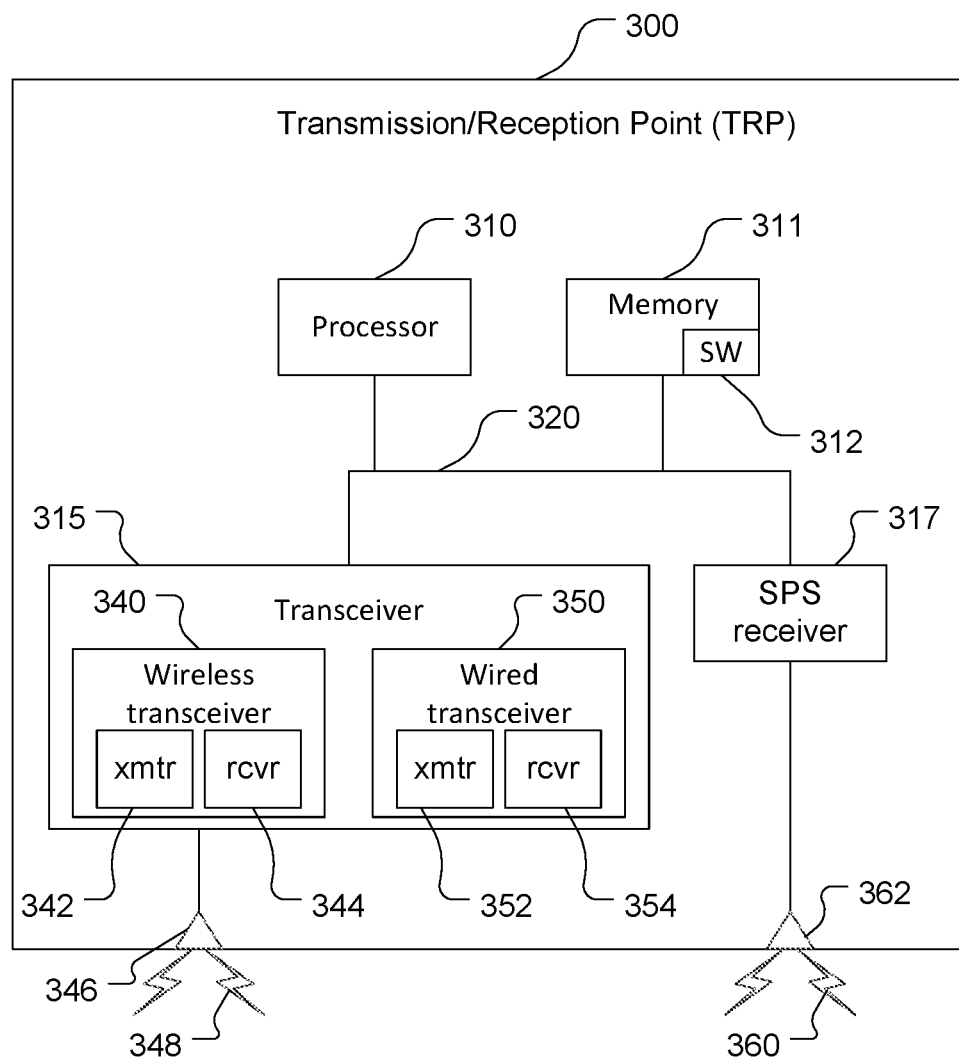
FIG. 3 is a block diagram of components of an example transmission/reception point.
Figure 4:
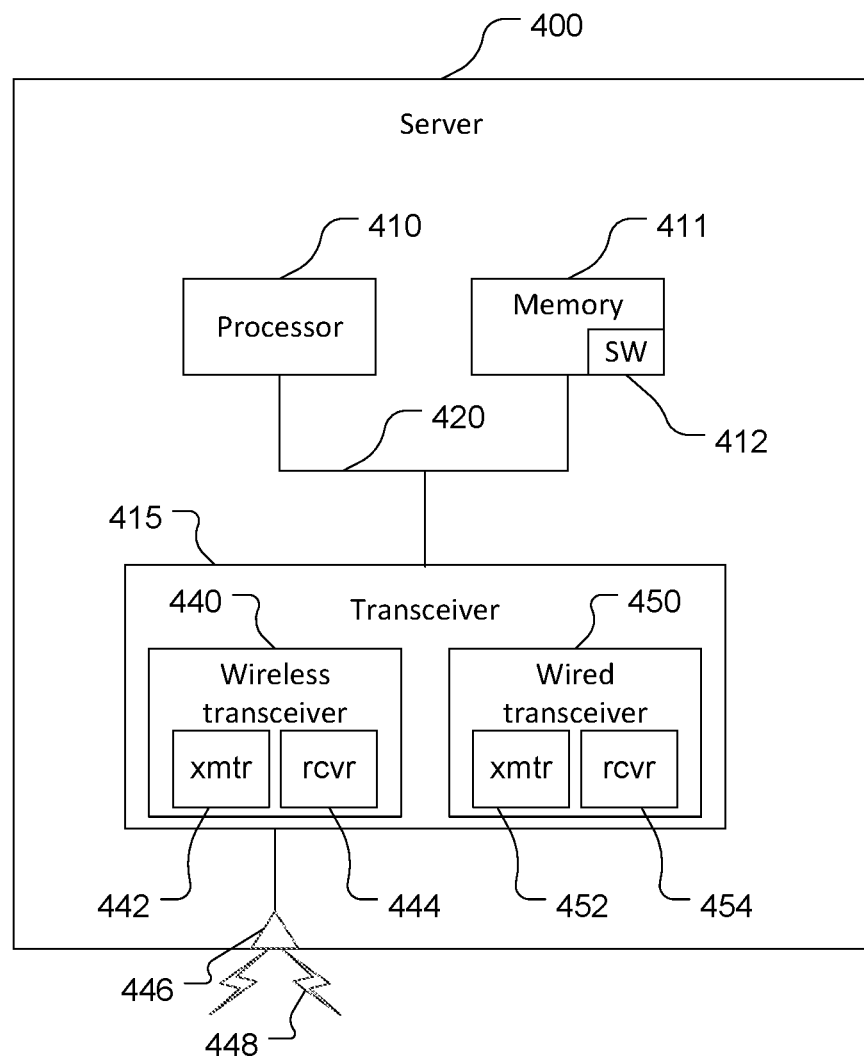
FIG. 4 is a block diagram of components of an example server, various embodiments of which are shown in FIG. 1.

Referring also to FIG. 3, an example of a TRP 300 of the BSs (e.g., gNB 110a, gNB 110b, ng-eNB 114) comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 4). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110a, gNB 110b, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels, downlink channels, and/or sidelink channels) and/or receiving (e.g., on one or more downlink channels, uplink channels, and/or sidelink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 4). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/ integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
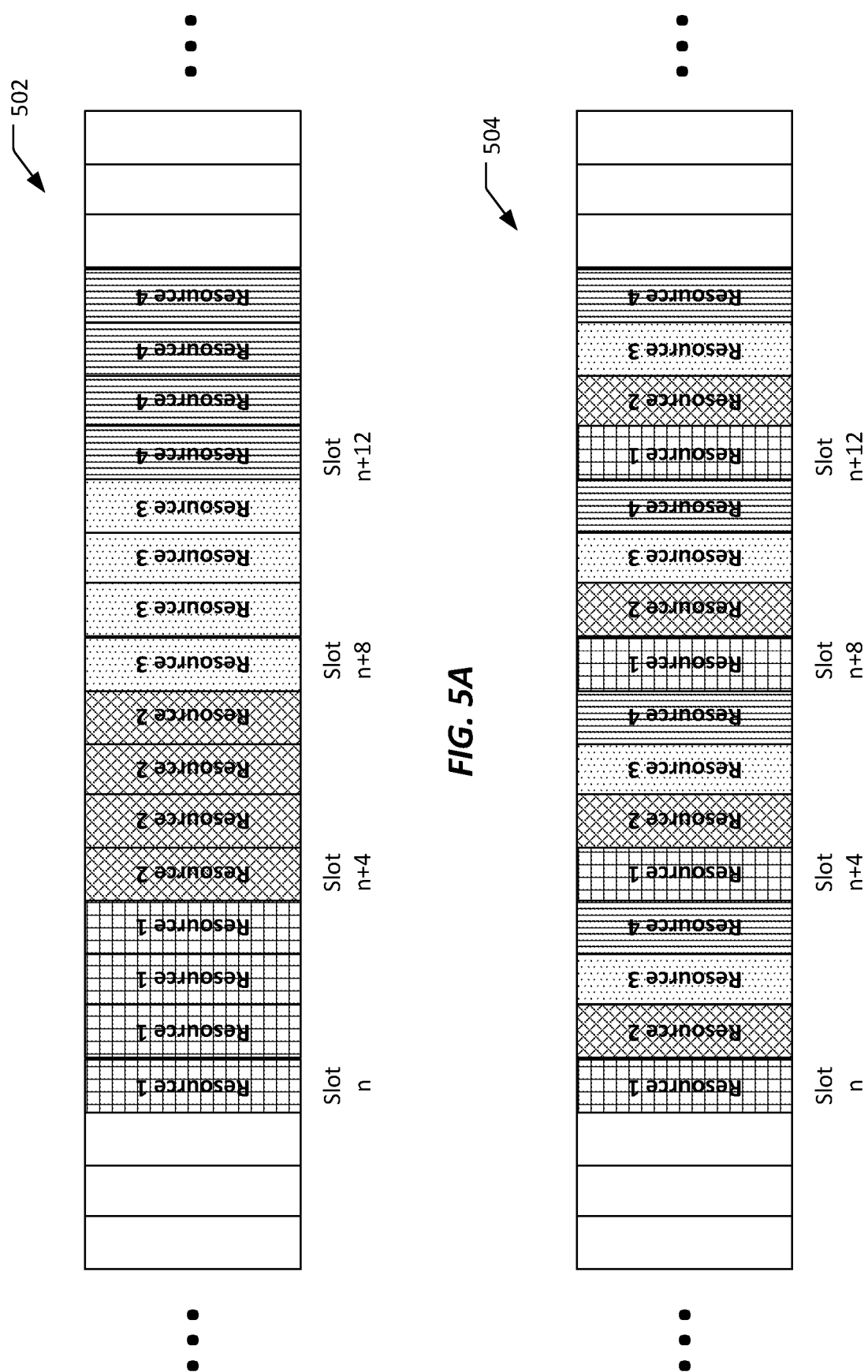
FIGS. 5A and 5B illustrate example downlink positioning reference signal resource sets.

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
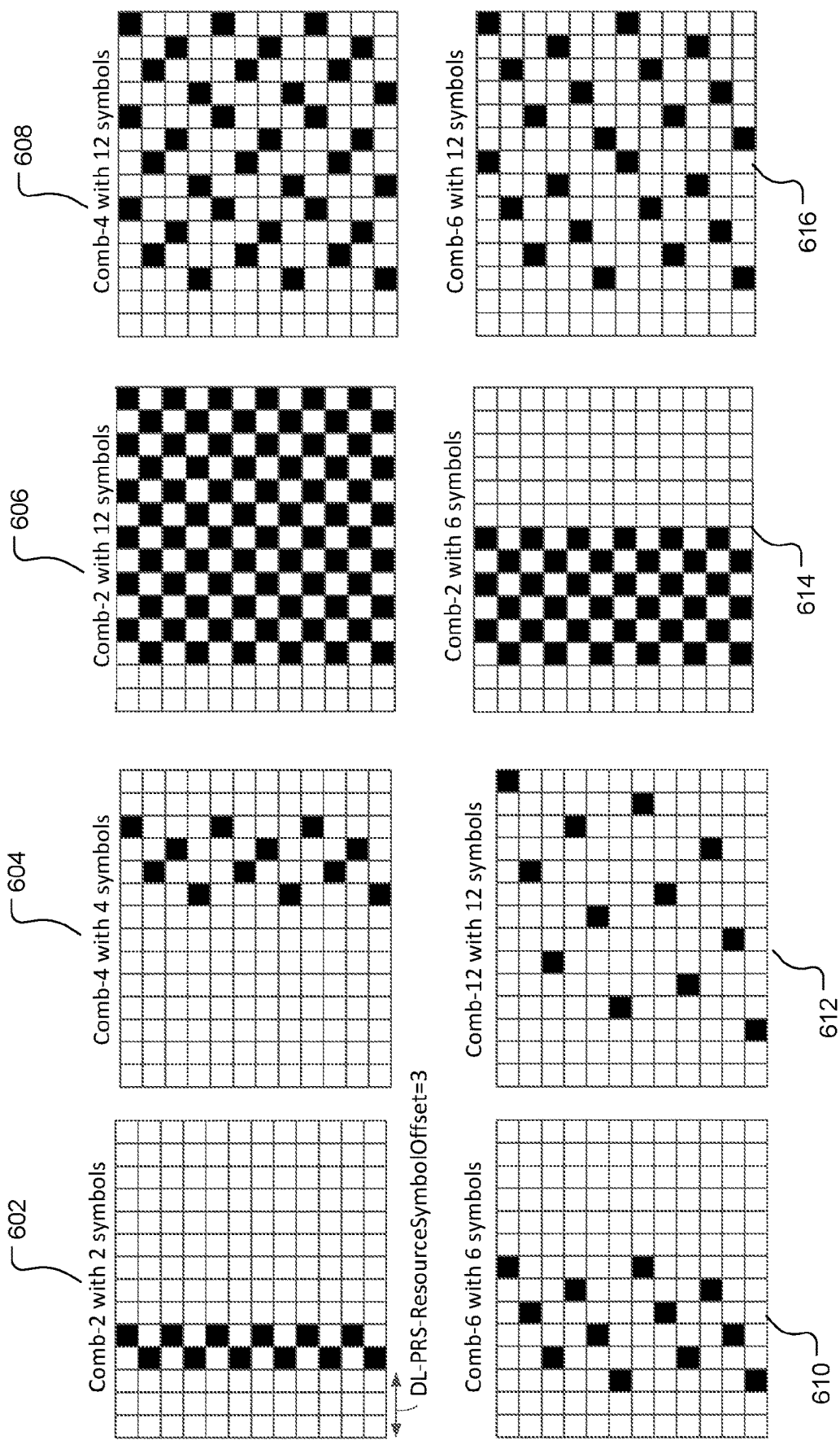
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity $T_{PRS}$, subframe offset $\Delta_{PRS}$, and PRS duration $N_{PRS}$. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity $T_{PRS}$ and the subframe offset $\Delta_{PRS}$ may be conveyed via a PRS configuration index $I_{PRS}$. The PRS configuration index and the PRS duration may be configured independently by higher layers. A set of $N_{PRS}$ consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

Figure 7:
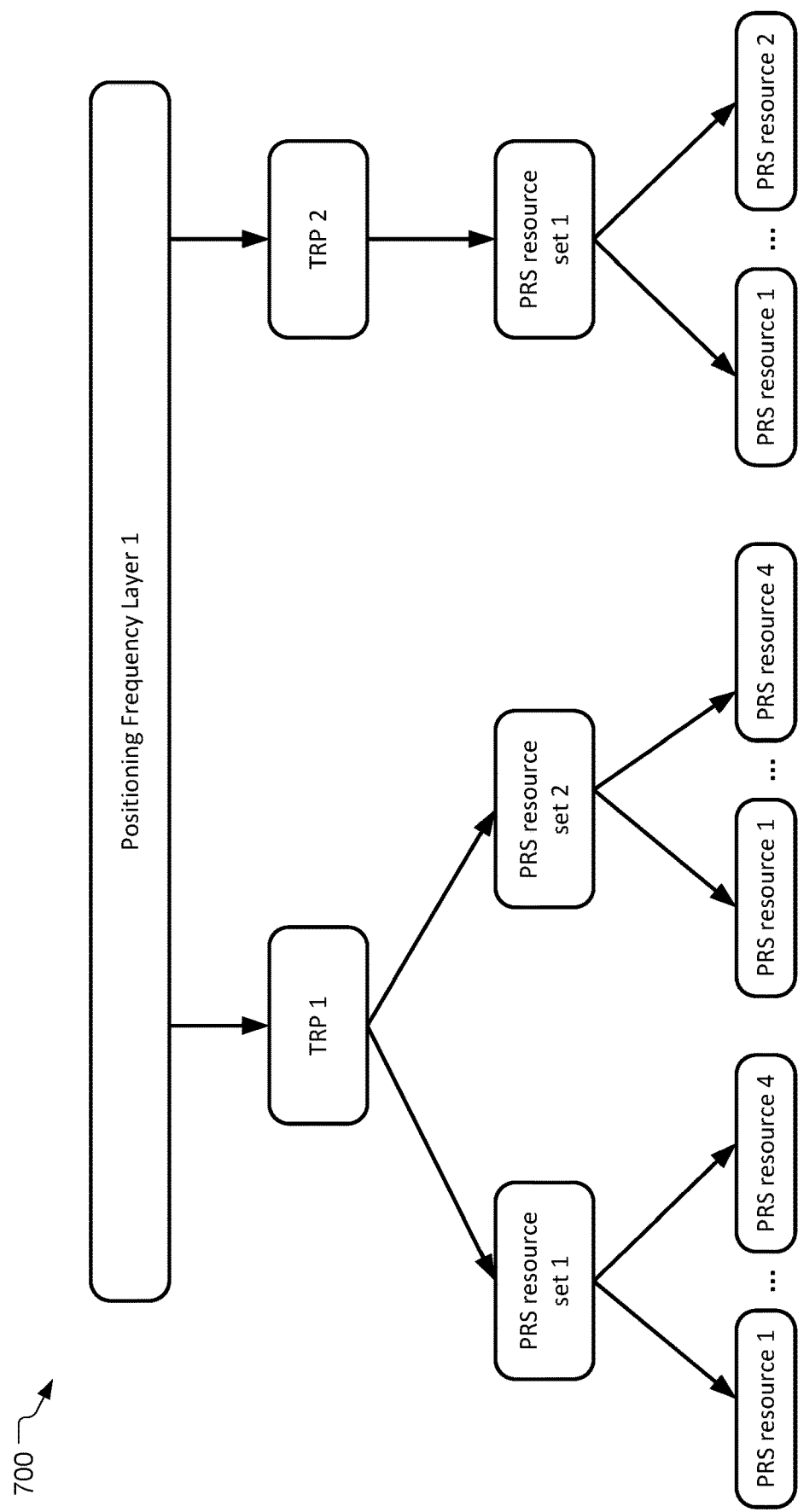
FIG. 7 is a diagram of an example positioning frequency layer.

Referring to FIG. 7, a diagram of an example positioning frequency layer 700 is shown. In an example, the positioning frequency layer 700 may be a collection of PRS resource sets across one or more TRPs. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS. Each of the PRS resource sets in the positioning frequency layer 700 is a collection of PRS resources across one TRP which have the same periodicity, a common muting pattern configuration, and the same repetition factor across slots.

Note that the terms positioning reference signal and PRS are reference signals that can be used for positioning, such as but not limited to, PRS signals, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

The ability of a UE to process PRS signals may vary based on the capabilities of the UE. In general, however, industry standards may be developed to establish a common PRS capability for UEs in a network. For example, an industry standard may require that a duration of DL PRS symbol in units of milliseconds (ms) a UE can process every T ms assuming a maximum DL PRS bandwidth in MHz, which is supported and reported by UE. As examples, and not limitations, the maximum DL PRS bandwidth for the FR1 bands may be 5, 10, 20, 40, 50, 80, 100 MHz, and for the FR2 bands may be 50, 100, 200, 400 MHz. The standards may also indicate a DL PRS buffering capability as a Type 1 (i.e., sub-slot/symbol level buffering), or a Type 2 (i.e., slot level buffering). The common UE capabilities may indicate a duration of DL PRS symbols N in units of ms a UE can process every T ms assuming maximum DL PRS bandwidth in MHz, which is supported and reported by a UE. Example T values may include 8, 16, 20, 30, 40, 80, 160, 320, 640, 1280 ms, and example N values may include 0.125, 0.25, 0.5, 1, 2, 4, 6, 8, 12, 16, 20, 25, 30, 32, 35, 40, 45, 50 ms. A UE may be configured to report a combination of (N, T) values per band, where N is a duration of DL PRS symbols in ms processed every T ms for a given maximum bandwidth (B) in MHz supported by a UE. In general, a UE may not be expected to support a DL PRS bandwidth that exceeds the reported DL PRS bandwidth value. The UE DL PRS processing capability may be defined for a single positioning frequency layer 700. The UE DL PRS processing capability may be agnostic to DL PRS comb factor configurations such as depicted in FIG. 6. The UE processing capability may indicate a maximum number of DL PRS resources that a UE can process in a slot under it. For example, the maximum number for FR1 bands may be 1, 2, 4, 6, 8, 12, 16, 24, 32, 48, 64 for each SCS: 15 kHz, 30 kHz, 60 kHz, and the maximum number for the FR2 bands may be 1, 2, 4, 6, 8, 12, 16, 24, 32, 48, 64 for each SCS: 15 kHz, 30 kHz, 60 kHz, 120 kHz.

Figure 8:
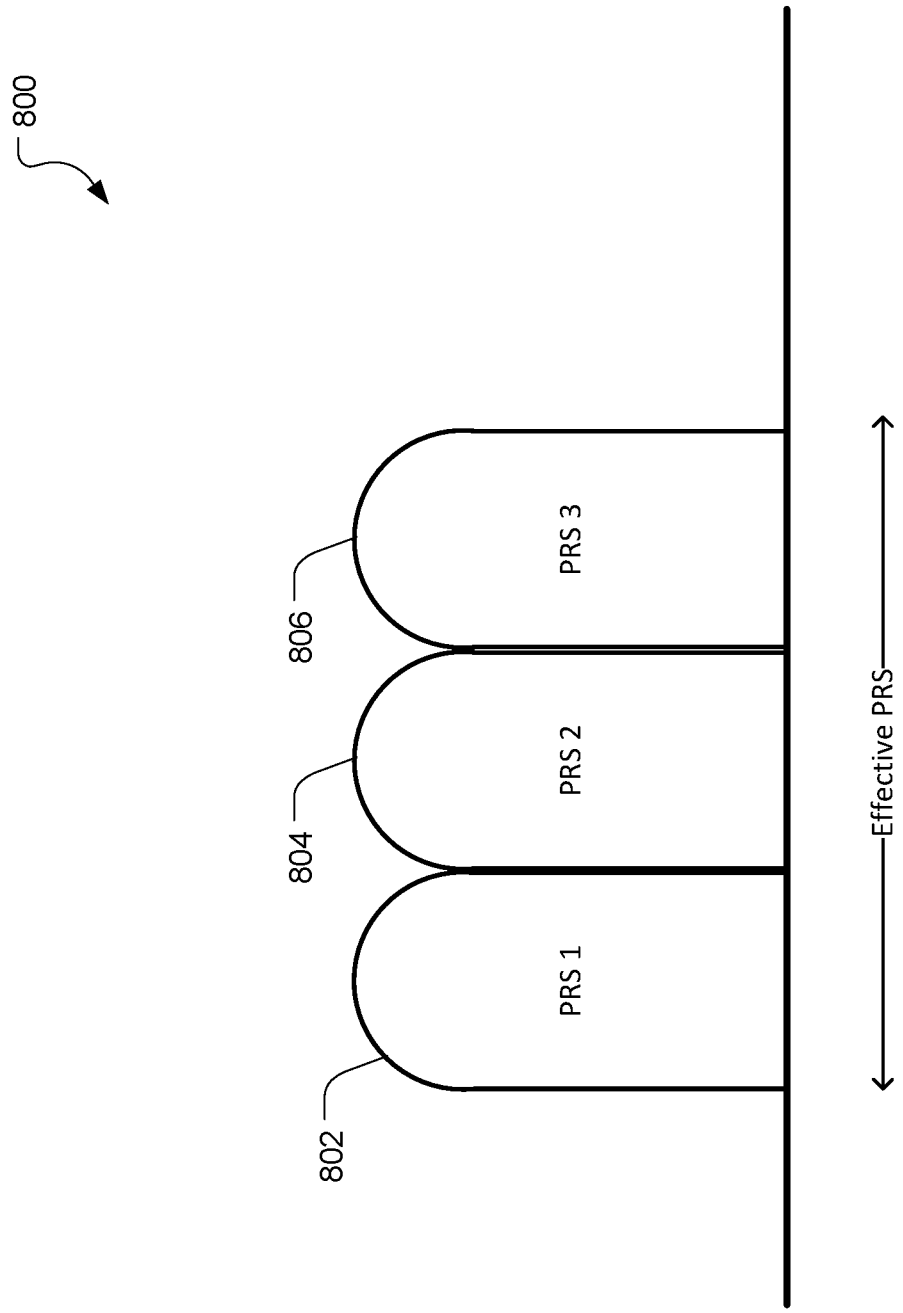
FIG. 8 is a diagram of an effective positioning reference signal bandwidth.

Referring to FIG. 8, a diagram 800 of an effective positioning reference signal bandwidth is shown. In an example, different positioning frequency layers may include different PRS bandwidths. A first positioning frequency layer may have a first PRS bandwidth 802, a second positioning frequency layer may have a second PRS bandwidth 804, and a third positioning frequency layer may have a third PRS bandwidth 806. In operation, a UE may be configured to combine the different PRS bandwidths to create a wider effective PRS bandwidth. The UE may then generate a signal report based on the effective bandwidths. That is, the UE may provide measurement values such as RSTD, RSRP, RX-TX, etc. for the effective bandwidths. For example, a UE may provide a single report for the contiguous first and second PRS bandwidths 802, 804, or the contiguous second and third PRS bandwidths 804, 806. The UE may also be configured to generate a single report based on stitching together the non-contiguous first and third PRS bandwidths 802, 806. Similarly, a non-contiguous PRS may be formed based on puncturing a portion of the PRS. For example, other downlink (DL) or uplink (UL) signals (e.g., in full duplex systems) may cause a gap in the PRS. Guard bands or other gaps within the effective PRS bandwidth may also create a non-contiguous PRS.

Figure 9A:
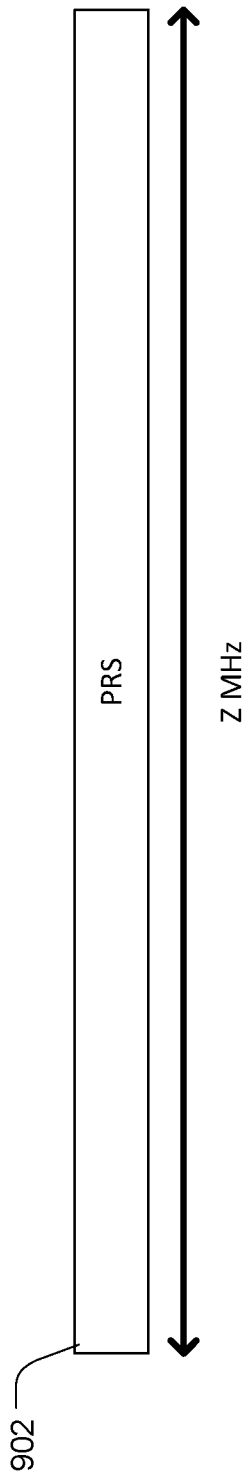
FIG. 9A is a diagram of a contiguous wideband positioning reference signal.
Figure 9B:
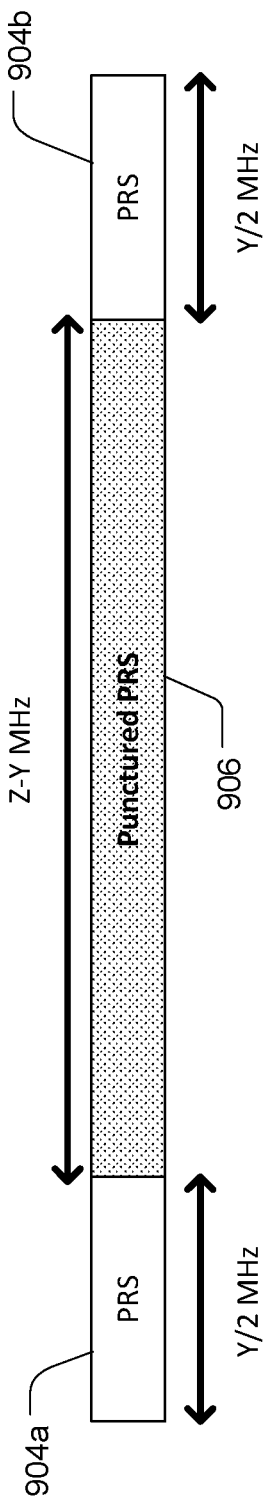
FIG. 9B is a diagram of a frequency domain non-contiguous wideband positioning reference signal.

Referring to FIGS. 9A and 9B, examples of contiguous and non-contiguous wideband PRS are shown. A frequency domain contiguous wideband PRS 902 may have an example bandwidth of Z MHz. The increased bandwidth may increase the accuracy of the PRS measurements with the increase in required overhead. The frequency domain non-contiguous wideband PRS depicted in FIG. 9B may include PRS transmissions in the edges 904a, 904b with other signals transmitted in the bandwidth between. For example, each of the edges 904a, 904b may have a bandwidth of Y/2 MHz, and a gap 906 may have a bandwidth of Z-Y MHz. The gap 906 may be due to collisions with other channels of higher priority (e.g., punctured). In an example, the gap 906 may be caused by UL channels in a full-duplex schema. A frequency domain bandwidth may have other gaps such as guard bands or gaps between positioning frequency layers (e.g., between the first PRS bandwidth 802 and the second PRS bandwidth 804 and/or the third PRS bandwidth 806). The techniques provided herein enable the UE 200 to utilize the frequency domain non-contiguous bandwidth PRS resources in the edges 904a-b, and the bandwidth of the gap 906 to achieve a higher accuracy than processing the edges 904a-b separately.

Figure 10A:
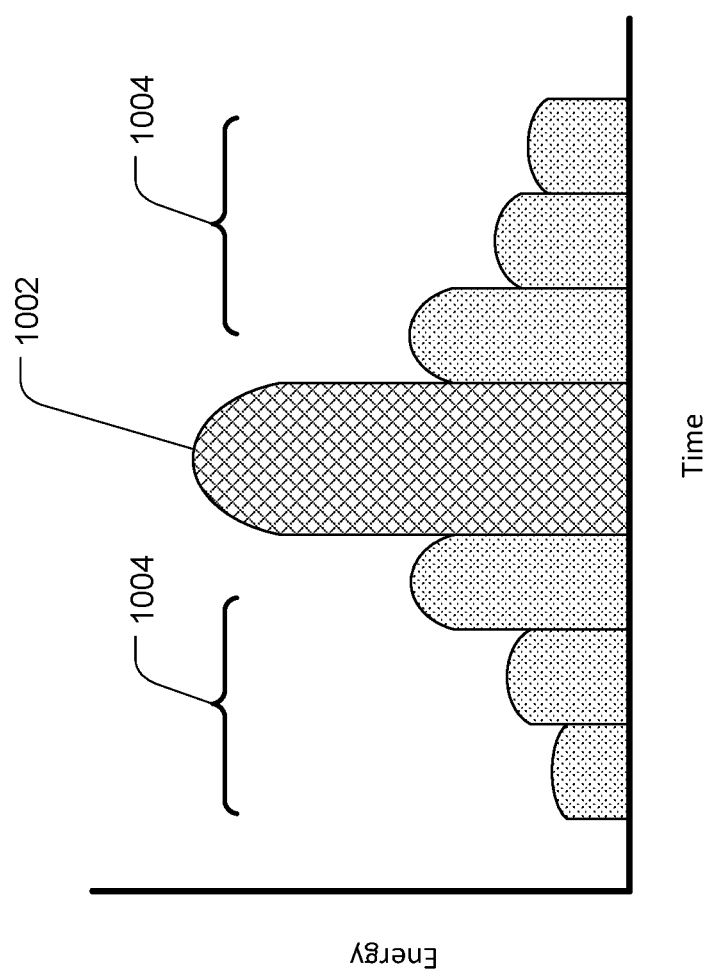
FIG. 10A is an example channel energy response based on wideband processing of a contiguous positioning reference signal.

Referring to FIG. 10A, an example channel energy response (CER) based on wideband processing of a contiguous positioning reference signal is shown. For example, the results of a wideband processing of the contiguous wideband PRS 902, such as performing an IFFT, may produce a strong peak signal 1002 in the time domain. The peak signal 1002 is distinguishable from the sidelobes 1004 and may be used to determine a time of arrival (TOA) for the contiguous wideband PRS 902. That is, the TOA of a PRS is the first (i.e., earliest) peak in the time domain. Thus, the accuracy of the TOA is based on the ability of the UE to distinguish the maximum value of the peak signal 1002.

Figure 10B:
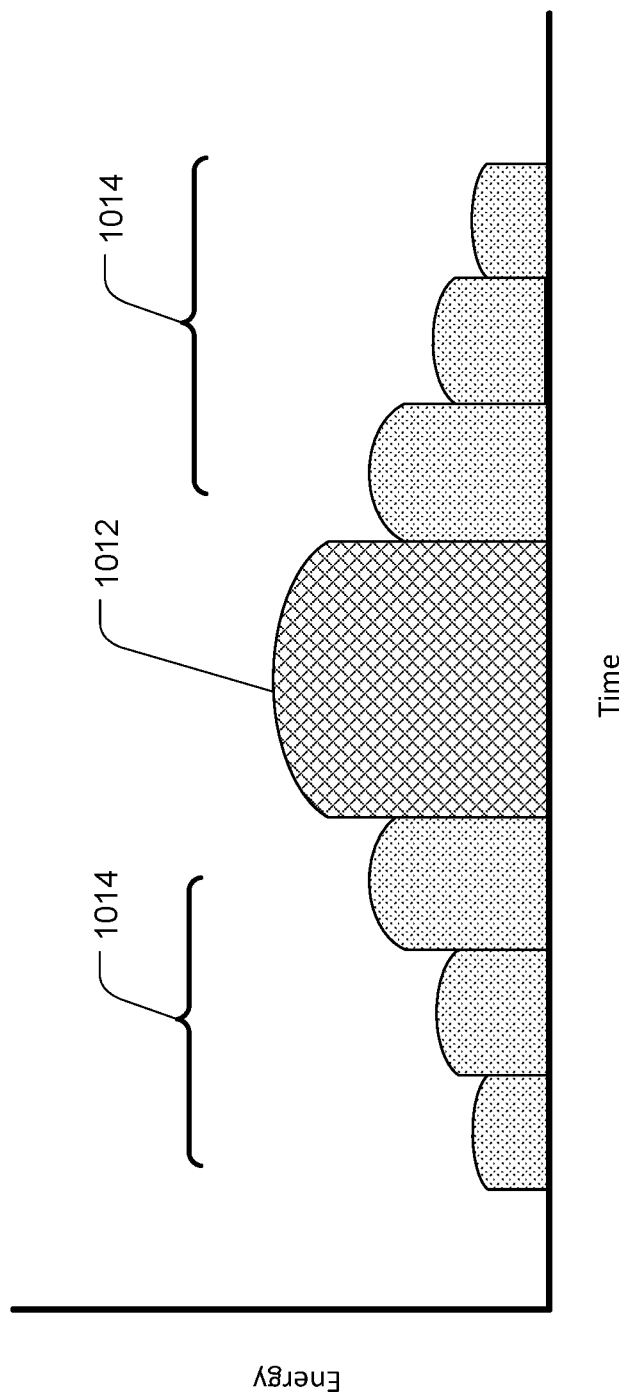
FIG. 10B is an example channel energy response based on narrowband processing of a frequency domain non-contiguous positioning reference signal.

Referring to FIG. 10B, an example CER based on narrowband processing of a non-contiguous PRS is shown. The time domain signals provided herein are examples to facilitate the description of a TOA computation. In operation, the signal peaks and sidelobes may not be as well formed as depicted in the figures. As used herein, the term narrowband processing refers to performing signal processing (e.g., IFFT) on at least a portion of the frequency domain PRS such as the resources in one or more of the edge portions (e.g., 904a, 904b). The term wideband processing refers to performing signal processing on at least a larger portion of the frequency domain PRS as compared to the narrowband processing. For example, wideband processing may include performing signal processing on the edges 904a-b and the gap 906 (i.e., a wider portion of the frequency domain PRS bandwidth). In an example, the narrowband processing on the frequency domain non-contiguous PRS in FIG. 9B may include performing IFFTs on the PRS resources on one or more of the edges 904a-b. The resulting CERs for the edges 904a-b may be added to obtain a combined CER. The resulting peak signal 1012 and sidelobes 1014 may be wider as compared to the peak signal 1002 for the contiguous PRS 902. The width of the peak signal 1012 may be inversely proportional to the bandwidth of the edges 904a-b. That is, the narrower the edge bandwidths (e.g., the edges 904a-b), the wider the peak signal 1012. The width of the peak signal 1012 may decrease the accuracy of the TOA because the maximum of the peak signal 1012 may be difficult to ascertain.

Figure 11:
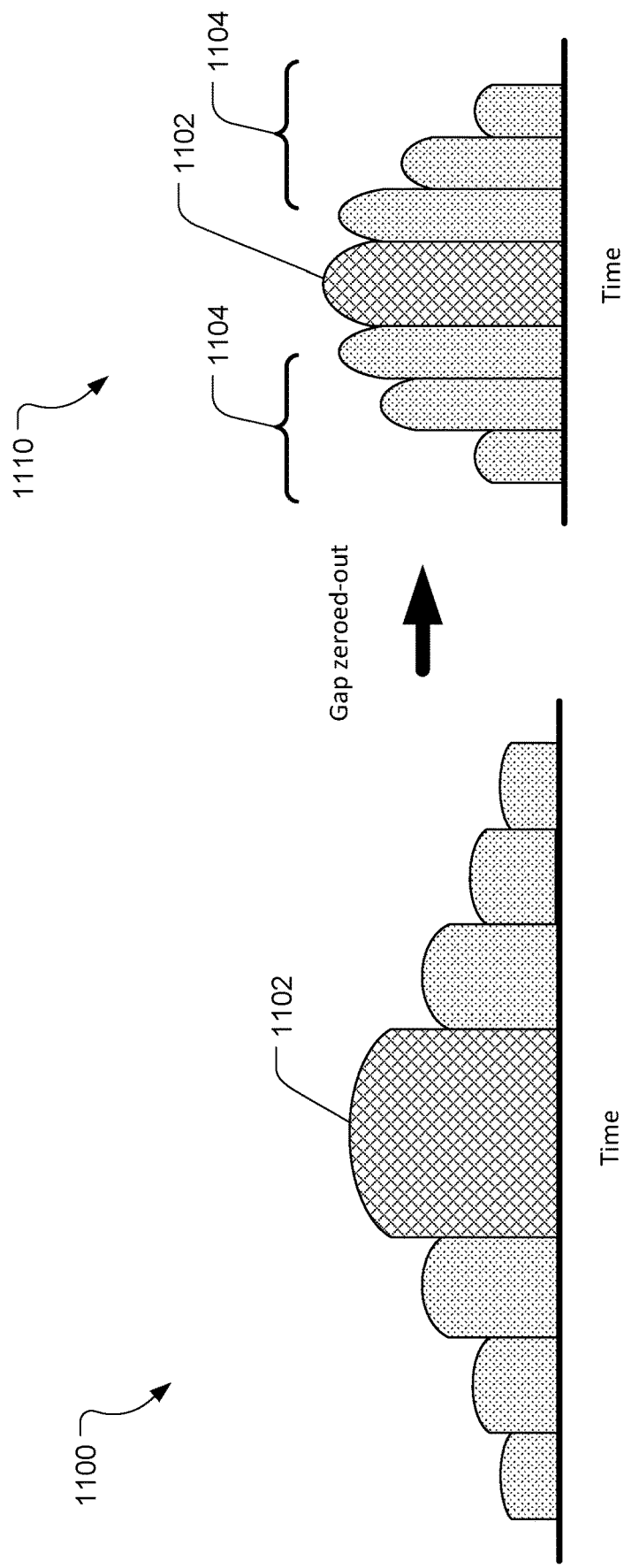
FIG. 11 is a diagram of an example of wideband processing of a frequency domain non-contiguous positioning reference signal.

Referring to FIG. 11, a diagram of an example of wideband processing of a non-contiguous positioning reference signal is shown. As described in FIG. 10B, the narrowband processing of the edges 904a-b may generate a time domain signal 1100 with a relatively wide peak signal 1102. The width of the peak signal 1102 may be reduced, and the corresponding TOA estimate may be improved, by processing a larger portion of the bandwidth of the non-contiguous PRS including, for example, the edges 904a-b and the gap 906. In this example, the tones in the gap 906 are set to zero (e.g., zeroed out) prior to performing the IFFT on the increased bandwidth. The resulting time domain signal 1110 may narrow the peak signal 1102 at the cost of increasing the sidelobe signals 1104. The increases in the sidelobe signals 1104 may degrade the overall resolution of the TOA results (i.e., the peak signal 1102 may be difficult to distinguish from the sidelobe signals 1104). Thus, in some circumstances, such as when the gap 906 exceeds more than 5% of the overall bandwidth, zeroing out the gap tones may degrade the TOA results. A combination of the narrowband and wideband processing, however, may be used to overcome this limitation.

Figure 12:
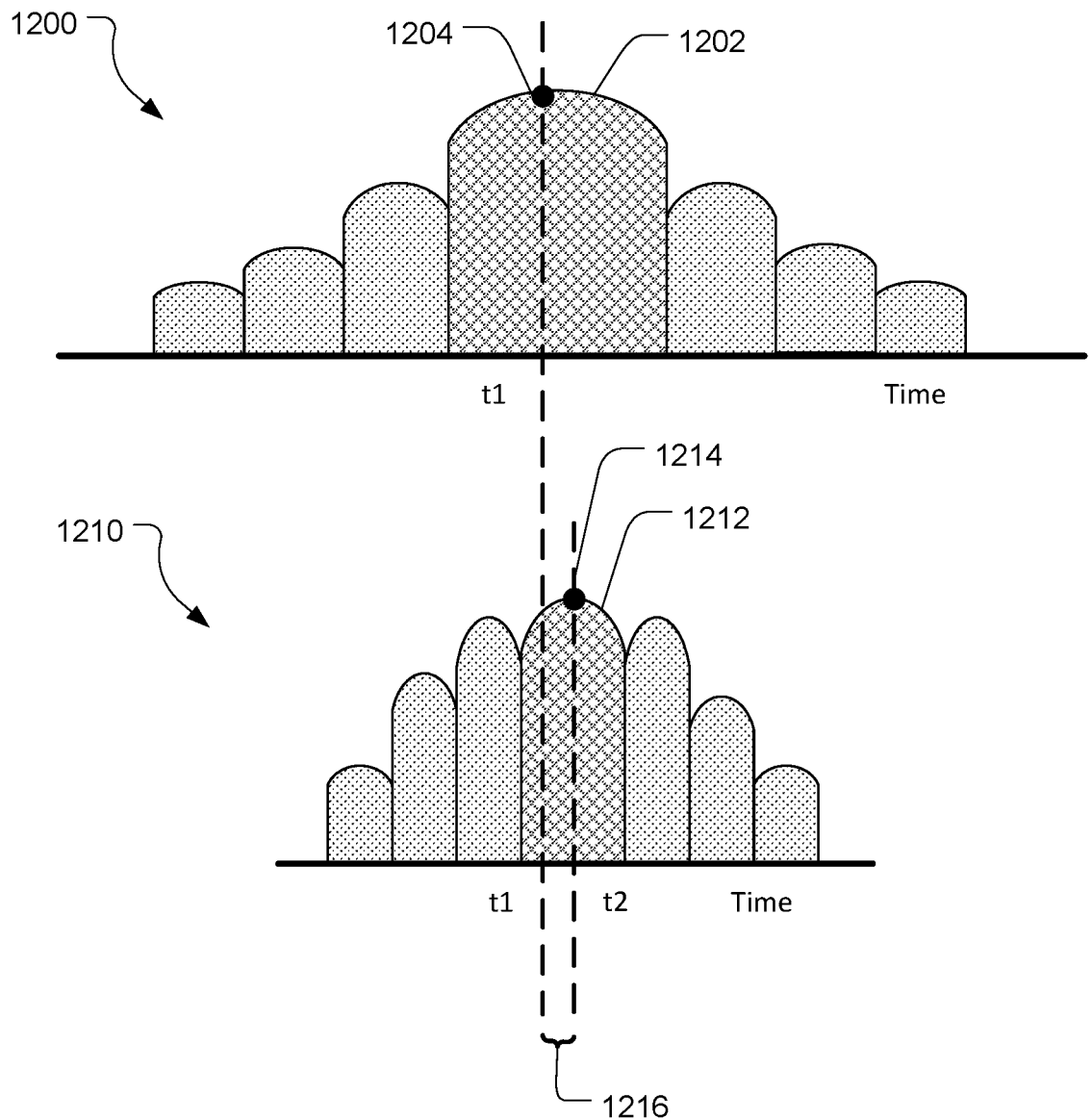
FIG. 12 is a diagram of a process for determining a time of arrival for a frequency domain non-contiguous positioning reference signal.

Referring to FIG. 12, a diagram of a process for determining a time of arrival for a frequency domain non-contiguous positioning reference signal is shown. In a first stage, a narrowband processing of the non-contiguous PRS such as described in FIG. 10B is performed to generate a first time domain signal 1200. In general, the narrowband processing includes processing one of X portions of the PRS, or processing all of them separately and derive separate measurements, or processing them separately and derive a Channel Energy Response (Non-coherent Processing) for each one, and then average them to derive a combined narrowband Channel Energy Response. In this type of processing, the time-domain resolution of the measurements is not increased linearly with the total bandwidth but depends on the narrowband bandwidth. For example, the first time domain signal 1200 may be a result of performing two small IFFTs on the edges 904a-b to generate the corresponding CERs, and then combining them to generate the narrowband CER. A first maximum value 1204 of the resulting peak signal 1202 is determined. The maximum value 1204 of the resulting peak signal 1202 is a first estimate of the TOA (i.e., the value 't1'). In a second stage, a wideband processing of the non-contiguous PRS such as described in FIG. 11 is performed. In general, in wideband processing, the UE 200 may be configured to combine all the frequency domain samples across all the respective narrowband bandwidths, and derive a Channel Impulse Response that has a higher time-domain resolution than would have been derived with a narrowband-based processing (e.g., maps the frequency domain samples in the same IFFT buffer before transforming the samples to the time-domain). In an example, the tones in the gap 906 may be zeroed out and an IFFT is computed for the wider bandwidth (i.e., Z MHz including the edges 904a-b and the zeroed out gap (e.g., the gap 906)) to generate a second time domain signal 1210 with a peak signal 1212. The location of the first maximum value 1204 (i.e., 't1') is used as a starting point to determine the maximum value of the peak signal 1212. For example, the value 't1' may be moved left or right along the time axis to detect an increase in the energy value. As depicted in FIG. 12, a second maximum value 1214 is obtained with a displacement 1216 to time 't2'. The time 't2' is the second estimate of the TOA based on the frequency domain non-contiguous PRS.

While the calculation of the TOA value is described in FIG. 12, the disclosure is not so limited. Other IFFT based computations may also be improved by applying the combination of the narrowband and wideband processing as described herein.

Figure 13:
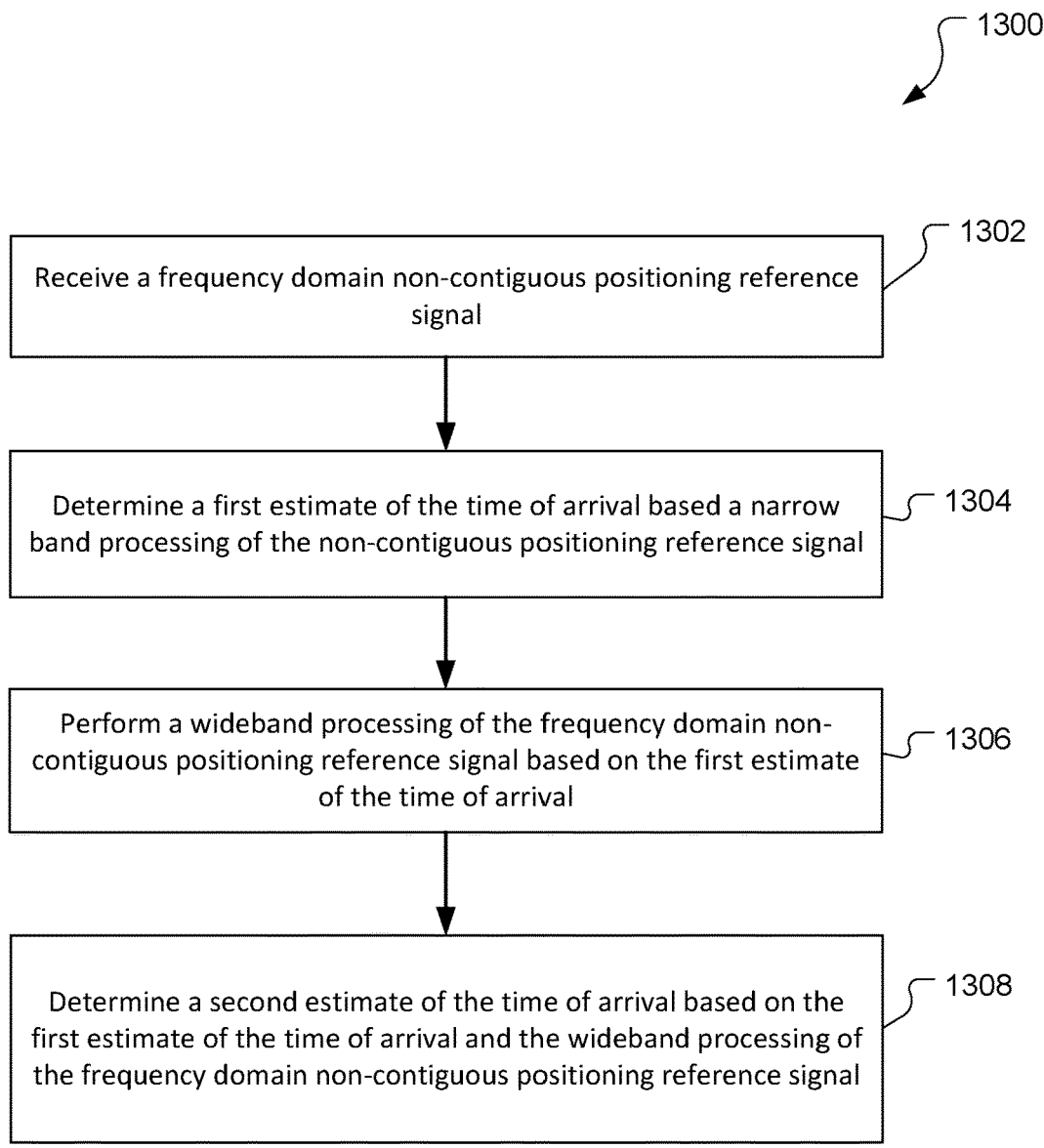
FIG. 13 is a process flow for an example method for computing a time of arrival for a frequency domain non-contiguous positioning reference signal.

Referring to FIG. 13, with further reference to FIGS. 1-12, a method 1300 for computing a time of arrival for a frequency domain non-contiguous positioning reference signal includes the stages shown. The method 1300 is, however, an example and not limiting. The method 1300 may be altered, e.g., by having stages added, removed, rearranged, combined, performed concurrently, and/or having single stages split into multiple stages.

At stage 1302, the method includes receiving a frequency domain non-contiguous positioning reference signal. The UE 200, including the general-purpose processor 230 and the transceiver 215, is a means for receiving the PRS. The non-contiguous PRS may be based on PRS resources in different positioning frequency layers and may include bandwidth gaps between the PRS resource blocks. The gaps between PRS resources may be based on other factors such as downlink and/or uplink channels with higher priorities. In an example, the puncture in the PRS may be based on full-duplex operations where a portion of the channel is allocated for uplink transmissions from the UE 200. For example, referring to FIG. 9B, a non-contiguous PRS may include PRS resources in the edges 904a-b, which are separated by the gap 906. In an example, the PRS bandwidth (i.e., Z MHz) may be 100 MHz and the edge bandwidths (i.e., Y/2 MHz) may each be 20 MHz. Other bandwidth sizes may also be used. In an embodiment, the method 1300 may be used to determine a TOA value when the gap 906 is greater than a threshold percentage of the total bandwidth of the PRS, or when the gap 906 is greater than a threshold number of resource blocks. For example, the threshold percentage may be 5%, or the threshold number of resource blocks may be 10 resource blocks. The gap 906 may be a function of the specified minimum guard bands between two component carriers (e.g., see 3GPP TS 38.101-1, Table 5.3.2-1).

At stage 1304, the method includes determining a first estimate of the time of arrival based on a narrowband processing of the non-contiguous positioning reference signal. The UE 200, including the general-purpose processor 230, is a means for determining the first estimate of the TOA. Referring to FIG. 12, the UE 200 is configured to determine small IFFTs on the PRS resources received at stage 1302. For example, the first time domain signal 1200 may be a result of performing one or more small IFFTs on the edges 904a-b of the non-contiguous PRS in FIG. 9B to generate the corresponding CERs, and then combining them to generate the narrowband CER. The maximum value 1204 of the resulting peak signal 1202 is the first estimate of the TOA. In an example, the UE 200 may be configured to provide the first estimate of the TOA to a network entity. The UE 200 may utilize wireless protocols such as LPP, NPP, Radio Resource Control (RRC) messaging, or other signaling interfaces to provide the first estimate of the TOA value to a network entity such as a base station (e.g., gNB 110a), or a location server (e.g., LMF 120).

At stage 1306, the method includes performing a wideband processing of the frequency domain non-contiguous positioning reference signal based on the first estimate of the time of arrival. The UE 200, including the general-purpose processor 230, is a means for performing the wideband processing. The UE 200 may be configured to combine the frequency domain samples across two or more narrowband bandwidths, and derive a Channel Impulse Response that has higher time-domain resolution than would have derived with a narrowband-based processing (e.g., maps the frequency domain samples in the same IFFT buffer before transforming the samples to the time-domain). In an example, the UE 200 is configured to perform wideband processing of the non-contiguous PRS such as described in FIG. 11. In an embodiment, the tones in the gap 906 may be zeroed out and an IFFT is computed for the a wider portion of the PRS bandwidth (i.e., Z MHz including the edges 904a-b and the zeroed out gap) to generate a time domain signal such as the second time domain signal 1210 with the peak signal 1212.

At stage 1308, the method includes determining a second estimate of the time of arrival based on the first estimate of the time of arrival and the wideband processing of the frequency domain non-contiguous positioning reference signal. The UE 200, including the general-purpose processor 230, is a means for determining the second estimate of the TOA. In an example, referring to FIG. 12, the UE 200 is configured to utilize the location of the first maximum value 1204 (i.e., the first estimate of the TOA 't1') as a starting point to determine the maximum value of the peak signal 1212. The UE 200 may increment or decrement the value 't1' (e.g., move it left or right along the time axis) to detect an increase in the energy value. The second maximum value 1214 at time 't2' is the second estimate of the TOA. The UE 200 may be configured to provide the second estimate of the TOA to a network entity via a wireless protocol such as LPP, NPP, RRC, etc.

Figure 14:
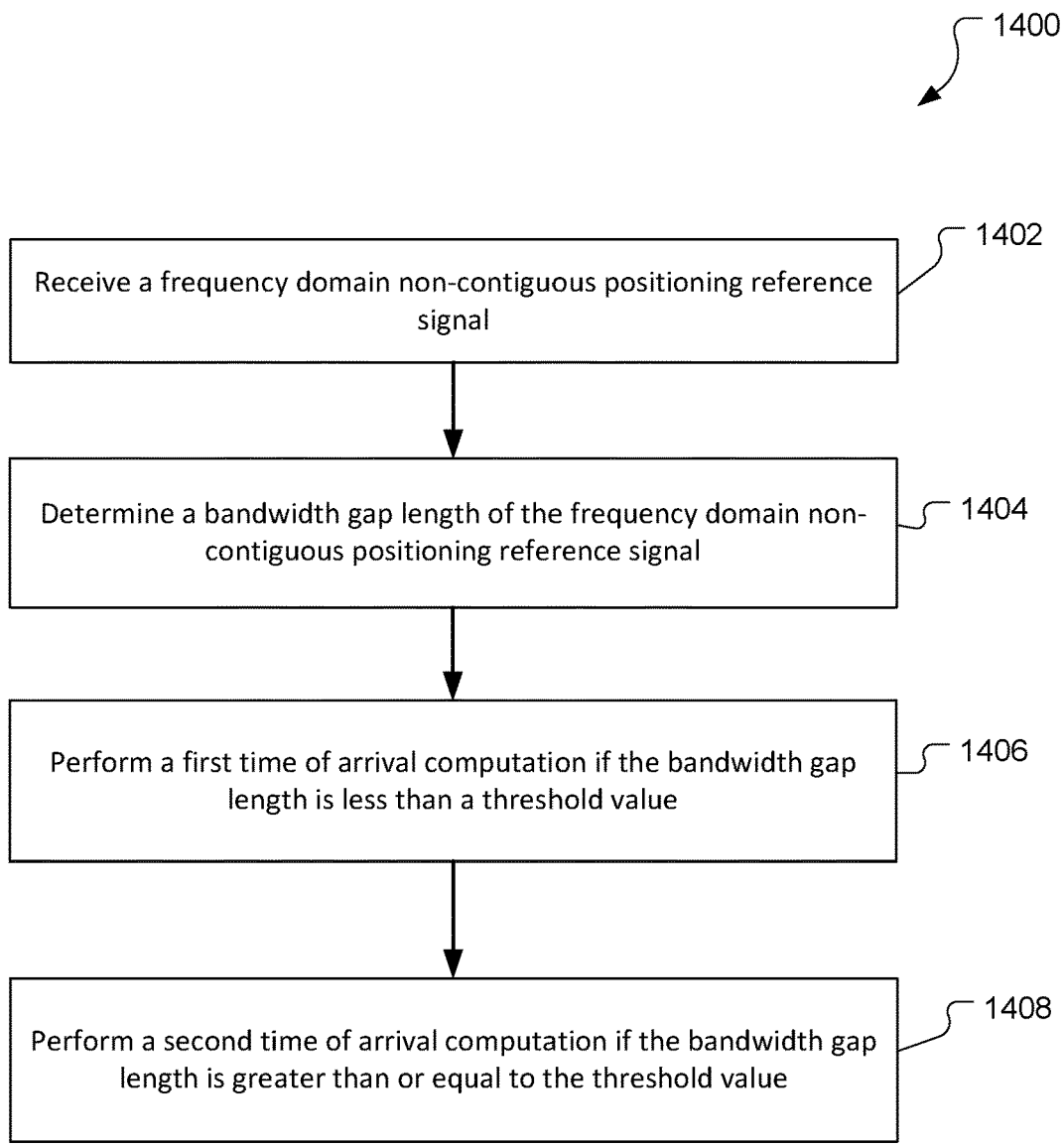
FIG. 14 is a process flow for an example method for determining a time of arrival for a frequency domain non-contiguous positioning reference signal.

Referring to FIG. 14, with further reference to FIGS. 1-12, a method 1400 for determining a time of arrival for a frequency domain non-contiguous positioning reference signal includes the stages shown. The method 1400 is, however, an example and not limiting. The method 1400 may be altered, e.g., by having stages added, removed, rearranged, combined, performed concurrently, and/or having single stages split into multiple stages.

At stage 1402, the method includes receiving a frequency domain non-contiguous positioning reference signal. The UE 200, including the general-purpose processor 230 and the transceiver 215, is a means for receiving the PRS. The non-contiguous PRS may be based on PRS resources in different positioning frequency layers and may include bandwidth gaps between the PRS resource blocks. The gaps between PRS resources may be based on other factors such as downlink and/or uplink channels with higher priorities. In an example, the puncture in the PRS may be based on full-duplex operations where a portion of the channel is allocated for uplink transmissions from the UE 200. For example, referring to FIG. 9B, a non-contiguous PRS may include PRS resources in the edges 904a-b, which are separated by the gap 906.

At stage 1404, the method includes determining a bandwidth gap length of the frequency domain non-contiguous positioning reference signal. The UE 200, including the general-purpose processor 230 and the transceiver 215, is a means for determining the bandwidth gap length. The gap 906 may be based on guard bands and other known gaps in the configurations of the positioning frequency layers. Other network configuration options may also be used to determine the gap length. In an example, the PRS may be punctured due to collisions with other channels of higher priority. The relationship between the bandwidths of the edges 904a-b and the gap 906 may vary based on the network and the frequency layer. In an example, the PRS bandwidth (i.e., Z MHz) may be 100 MHz and the edge bandwidths (i.e., Y/2 MHz) may each be 20 MHz.

At stage 1406, the method includes performing a first time of arrival computation if the bandwidth gap length is less than a threshold value. The UE 200, including the general-purpose processor 230, is a means for performing the first TOA computation. In general, for smaller gap sizes, the narrowband processing depicted in FIG. 10B is sufficient for determining a TOA value. In an example, the narrowband processing may be used when the gap 906 is less than a threshold percentage of the total bandwidth of the PRS, or when the gap 906 is less than threshold number of resource blocks. For example, the threshold percentage may be 5%, or the threshold number of resource blocks may be 10 resource blocks. The UE 200 is configured to perform the narrowband processing to generate the first time domain signal 1200 by performing one or more small IFFTs on the edges 904a-b. The resulting first maximum value 1204 of the resulting peak signal 1202 is determined. The maximum value 1204 of the resulting peak signal 1202 is used as the TOA. Utilizing the first time of arrival computation provides the advantage of a decreased measurement period. That is, the UE 200 is required to perform one IFFT (i.e., the one or more small IFFTs on the edges on the PRS) as opposed to two IFFT operations as described in FIG. 12 (i.e., the IFFTs associated with the narrowband and wideband processing).

At stage 1408, the method includes performing a second time of arrival computation if the bandwidth gap length is greater than or equal to the threshold value. The UE 200, including the general-purpose processor 230, is a means for performing the second TOA computation. In general, for larger gap sizes, the combination of the narrowband and wideband processing depicted in FIG. 12 may be used to determine a TOA value. In an example, the combination of the narrowband and wideband processing may be used when the gap 906 is greater than a threshold percentage of the total bandwidth of the PRS, or when the gap 906 is greater than threshold number of resource blocks. For example, the threshold percentage may be 5%, or the threshold number of resource blocks may be 10 resource blocks. Other threshold values may be used. The objective of selecting one of the first or second TOA computations is to improve the TOA results and/or the corresponding application performance. For example, the second TOA computation utilizes two IFFT operations as depicted in FIG. 12 and thus may require a longer measurement time as compared to the first TOA computation. Thus, a balance between the accuracy and measurement time may also be factored when a TOA computation is selected.

The techniques provided herein are not limited to positioning reference signals. Other reference signals such as tracking reference signals (TRS), cell-specific reference signals (CRS), channel state information reference signals (CSI-RS), primary synchronization signals (PSS), secondary synchronization signals (SSS), sounding reference signals (SRS), etc. may be provided in a non-contiguous bandwidth and a TRP 300 and/or UE 200 may be configured to apply the narrowband and wideband processing described herein.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Components, functional or otherwise, shown in the figures and/or discussed herein as being connected or communicating with each other are communicatively coupled unless otherwise noted. That is, they may be directly or indirectly connected to enable communication between them.

As used herein, unless otherwise stated, a statement that a function or operation is "based on" an item or condition means that the function or operation is based on the stated item or condition and may be based on one or more items and/or conditions in addition to the stated item or condition.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for determining a time of arrival of a frequency domain non-contiguous positioning reference signal, comprising:
receiving the frequency domain non-contiguous positioning reference signal;
determining a first estimate of the time of arrival based on a narrowband processing of the frequency domain non-contiguous positioning reference signal;
performing a wideband processing of the frequency domain non-contiguous positioning reference signal based on the first estimate of the time of arrival; and
determining a second estimate of the time of arrival based on the first estimate of the time of arrival and the wideband processing of the frequency domain non-contiguous positioning reference signal.

2. The method of clause 1 wherein the frequency domain non-contiguous positioning reference signal includes two or more positioning reference signal resources of two separate positioning frequency layers.

3. The method of clause 1 wherein a gap in the frequency domain non-contiguous positioning reference signal is based on a guard band between two positioning frequency layers.

4. The method of clause 1 wherein a gap in the frequency domain non-contiguous positioning reference signal is due to collisions caused by signals on other channels.

5. The method of clause 1 wherein the wideband processing includes setting a plurality of received frequency domain resources in a gap in the frequency domain non-contiguous positioning reference signal to a value of zero.

6. The method of clause 1 further comprising transmitting the first estimate of the time of arrival to a network entity.

7. The method of clause 1 further comprising transmitting the second estimate of the time of arrival to a network entity.

8. The method of clause 1 wherein a gap in the frequency domain non-contiguous positioning reference signal is greater than a threshold percentage of a total bandwidth of the frequency domain non-contiguous positioning reference signal.

9. The method of clause 8 wherein the threshold percentage is five percent.

10. The method of clause 1 wherein a gap in the frequency domain non-contiguous positioning reference signal is greater than a threshold number of resource blocks.

11. The method of clause 10 wherein the threshold number of resource blocks is 10 resource blocks.

12. A method of determining a time of arrival of a frequency domain non-contiguous positioning reference signal, comprising:
receiving the frequency domain non-contiguous positioning reference signal;
determining a bandwidth gap length of the frequency domain non-contiguous positioning reference signal;
performing a first time of arrival computation if the bandwidth gap length is less than a threshold value; and
performing a second time of arrival computation if the bandwidth gap length is greater than or equal to the threshold value.

13. The method of clause 12 wherein the first time of arrival computation comprises a narrowband processing of the frequency domain non-contiguous positioning reference signal.

14. The method of clause 13 wherein the narrowband processing include performing one or more Inverse Fast Fourier Transforms on at least a portion of the frequency domain non-contiguous positioning reference signal.

15. The method of clause 12 wherein the second time of arrival computation comprises a narrowband processing and a wideband processing of the frequency domain non-contiguous positioning reference signal.

16. The method clause 15 wherein the wideband processing comprises setting a plurality of received frequency domain resources in a gap in the frequency domain non-contiguous positioning reference signal to a value of zero and performing an Inverse Fast Fourier Transform on the frequency domain non-contiguous positioning reference signal including the gap.

17. The method of clause 15 further comprising sending a first estimated time of arrival value and a second estimated time of arrival value to a network entity.

18. The method of clause 12 wherein the threshold value is 5% of a total bandwidth of the frequency domain non-contiguous positioning reference signal.

19. The method of clause 12 wherein the threshold value is 10 resource blocks.

20. The method of clause 12 wherein the frequency domain non-contiguous positioning reference signal includes two or more positioning reference signal resources of two separate positioning frequency layers.

21. An apparatus, comprising:
a memory;
at least one transceiver;
at least one processor communicatively coupled to the memory and the at least one transceiver and configured to:
receive a frequency domain non-contiguous positioning reference signal;
determine a first estimate of a time of arrival based on a narrowband processing of the frequency domain non-contiguous positioning reference signal;
perform a wideband processing of the frequency domain non-contiguous positioning reference signal based on the first estimate of the time of arrival; and
determine a second estimate of the time of arrival based on the first estimate of the time of arrival and the wideband processing of the frequency domain non-contiguous positioning reference signal.

22. The apparatus of clause 21 wherein the frequency domain non-contiguous positioning reference signal includes two or more positioning reference signal resources of two separate positioning frequency layers.

23. The apparatus of clause 21 wherein a gap in the frequency domain non-contiguous positioning reference signal is based on a guard band between two positioning frequency layers.

24. The apparatus of clause 21 wherein a gap in the frequency domain non-contiguous positioning reference signal is due to collisions caused by signals on other channels.

25. The apparatus of clause 21 wherein the at least one processor is further configured to perform the wideband processing by setting a plurality of received frequency domain resources in a gap in the frequency domain non-contiguous positioning reference signal to a value of zero.

26. The apparatus of clause 21 wherein the at least one processor is further configured to transmit the first estimate of the time of arrival to a network entity.

27. The apparatus of clause 21 wherein the at least one processor is further configured to transmit the second estimate of the time of arrival to a network entity.

28. The apparatus of clause 21 wherein a gap in the frequency domain non-contiguous positioning reference signal is greater than a threshold percentage of a total bandwidth of the frequency domain non-contiguous positioning reference signal.

29. The apparatus of clause 28 wherein the threshold percentage is five percent.

30. The apparatus of clause 21 wherein a gap in the frequency domain non-contiguous positioning reference signal is greater than a threshold number of resource blocks.

31. The apparatus of clause 30 wherein the threshold number of resource blocks is 10 resource blocks.

32. An apparatus, comprising:
a memory;
at least one transceiver;
at least one processor communicatively coupled to the memory and the at least one transceiver and configured to:
receive a frequency domain non-contiguous positioning reference signal;
determine a bandwidth gap length of the frequency domain non-contiguous positioning reference signal;
perform a first time of arrival computation if the bandwidth gap length is less than a threshold value; and
perform a second time of arrival computation if the bandwidth gap length is greater than or equal to the threshold value.

33. The apparatus of clause 32 wherein the first time of arrival computation comprises a narrowband processing of the frequency domain non-contiguous positioning reference signal.

34. The apparatus of clause 33 wherein the narrowband processing includes performing one or more Inverse Fast Fourier Transforms on at least a portion of the frequency domain non-contiguous positioning reference signal.

35. The apparatus of clause 32 wherein the second time of arrival computation comprises a narrowband processing and a wideband processing of the frequency domain non-contiguous positioning reference signal.

36. The apparatus clause 35 wherein the wideband processing comprises setting a plurality of received frequency domain resources in a gap in the frequency domain non-contiguous positioning reference signal to a value of zero and performing an Inverse Fast Fourier Transform on the frequency domain non-contiguous positioning reference signal including the gap.

37. The apparatus of clause 35 wherein the at least one processor is further configured to send a first estimated time of arrival value and a second estimated time of arrival value to a network entity.

38. The apparatus of clause 32 wherein the threshold value is 5% of a total bandwidth of the frequency domain non-contiguous positioning reference signal.

39. The apparatus of clause 32 wherein the threshold value is 10 resource blocks.

40. The apparatus of clause 32 wherein the frequency domain non-contiguous positioning reference signal includes two or more positioning reference signal resources of two separate positioning frequency layers.

41. An apparatus for determining a time of arrival of a frequency domain non-contiguous positioning reference signal, comprising:
means for receiving the frequency domain non-contiguous positioning reference signal;
means for determining a first estimate of the time of arrival based on a narrowband processing of the frequency domain non-contiguous positioning reference signal;
means for performing a wideband processing of the frequency domain non-contiguous positioning reference signal based on the first estimate of the time of arrival; and
means for determining a second estimate of the time of arrival based on the first estimate of the time of arrival and the wideband processing of the frequency domain non-contiguous positioning reference signal.

42. An apparatus for determining a time of arrival of a frequency domain non-contiguous positioning reference signal, comprising:
means for receiving the frequency domain non-contiguous positioning reference signal;
means for determining a bandwidth gap length of the frequency domain non-contiguous positioning reference signal;
means for performing a first time of arrival computation if the bandwidth gap length is less than a threshold value; and
means for performing a second time of arrival computation if the bandwidth gap length is greater than or equal to the threshold value.

43. A non-transitory processor-readable storage medium comprising processor-readable instructions configured to cause one or more processors to determine a time of arrival of a frequency domain non-contiguous positioning reference signal, comprising:
code for receiving the frequency domain non-contiguous positioning reference signal;
code for determining a first estimate of the time of arrival based on a narrowband processing of the frequency domain non-contiguous positioning reference signal;
code for performing a wideband processing of the frequency domain non-contiguous positioning reference signal based on the first estimate of the time of arrival; and
code for determining a second estimate of the time of arrival based on the first estimate of the time of arrival and the wideband processing of the frequency domain non-contiguous positioning reference signal.

44. A non-transitory processor-readable storage medium comprising processor-readable instructions configured to cause one or more processors to determine a time of arrival of a frequency domain non-contiguous positioning reference signal, comprising:
code for receiving the frequency domain non-contiguous positioning reference signal;
code for determining a bandwidth gap length of the frequency domain non-contiguous positioning reference signal;
code for performing a first time of arrival computation if the bandwidth gap length is less than a threshold value; and
code for performing a second time of arrival computation if the bandwidth gap length is greater than or equal to the threshold value.

The invention claimed is:

1. A method for determining a time of arrival of a frequency domain non-contiguous positioning reference signal, comprising:
receiving the frequency domain non-contiguous positioning reference signal;
determining a first estimate of the time of arrival based on a narrowband processing of the frequency domain non-contiguous positioning reference signal;
performing a wideband processing of the frequency domain non-contiguous positioning reference signal based on the first estimate of the time of arrival, wherein the wideband processing includes setting a plurality of received frequency domain resources in a gap in the frequency domain non-contiguous positioning reference signal to a value of zero; and determining a second estimate of the time of arrival based on the first estimate of the time of arrival and the wideband processing of the frequency domain non-contiguous positioning reference signal.

2. The method of claim 1 wherein the frequency domain non-contiguous positioning reference signal includes two or more positioning reference signal resources of two separate positioning frequency layers.

3. The method of claim 1 wherein a gap in the frequency domain non-contiguous positioning reference signal is based on a guard band between two positioning frequency layers.

4. The method of claim 1 wherein a gap in the frequency domain non-contiguous positioning reference signal is due to collisions caused by signals on other channels.

5. The method of claim 1 further comprising transmitting the first estimate of the time of arrival or the second estimate of the time of arrival to a network entity.

6. The method of claim 1 wherein a gap in the frequency domain non-contiguous positioning reference signal is greater than a threshold percentage of a total bandwidth of the frequency domain non-contiguous positioning reference signal.

7. The method of claim 6 wherein the threshold percentage is five percent.

8. The method of claim 1 wherein a gap in the frequency domain non-contiguous positioning reference signal is greater than a threshold number of resource blocks.

9. The method of claim 8 wherein the threshold number of resource blocks is 10 resource blocks.

10. A method of determining a time of arrival of a frequency domain non-contiguous positioning reference signal, comprising:
receiving the frequency domain non-contiguous positioning reference signal;
determining a bandwidth gap length of the frequency domain non-contiguous positioning reference signal;
performing a first time of arrival computation when the bandwidth gap length is less than a threshold value; and
performing a second time of arrival computation when the bandwidth gap length is greater than or equal to the threshold value.

11. The method of claim 10 wherein the first time of arrival computation comprises a narrowband processing of the frequency domain non-contiguous positioning reference signal.

12. The method of claim 11 wherein the narrowband processing include performing one or more Inverse Fast Fourier Transforms on at least a portion of the frequency domain non-contiguous positioning reference signal.

13. The method of claim 10 wherein the second time of arrival computation comprises a narrowband processing and a wideband processing of the frequency domain non-contiguous positioning reference signal.

14. The method claim 13 wherein the wideband processing comprises setting a plurality of received frequency domain resources in a gap in the frequency domain non-contiguous positioning reference signal to a value of zero and performing an Inverse Fast Fourier Transform on the frequency domain non-contiguous positioning reference signal including the gap.

15. The method of claim 10 further comprising sending a first estimated time of arrival value and a second estimated time of arrival value to a network entity.

16. The method of claim 10 wherein the threshold value is 5% of a total bandwidth of the frequency domain non-contiguous positioning reference signal.

17. The method of claim 10 wherein the threshold value is 10 resource blocks.

18. The method of claim 10 wherein the frequency domain non-contiguous positioning reference signal includes two or more positioning reference signal resources of two separate positioning frequency layers.

19. An apparatus, comprising:
a memory;
at least one transceiver;
at least one processor communicatively coupled to the memory and the at least one transceiver and configured to:
receive a frequency domain non-contiguous positioning reference signal;
determine a first estimate of a time of arrival based on a narrowband processing of the frequency domain non-contiguous positioning reference signal;
perform a wideband processing of the frequency domain non-contiguous positioning reference signal based on the first estimate of the time of arrival, wherein the at least one processor is further configured to perform the wideband processing by setting a plurality of received frequency domain resources in a gap in the frequency domain non-contiguous positioning reference signal to a value of zero; and
determine a second estimate of the time of arrival based on the first estimate of the time of arrival and the wideband processing of the frequency domain non-contiguous positioning reference signal.

20. The apparatus of claim 19 wherein the at least one processor is further configured to transmit the first estimate of the time of arrival or the second estimate of the time of arrival to a network entity.

21. The apparatus of claim 19 wherein a gap in the frequency domain non-contiguous positioning reference signal is greater than a threshold percentage of a total bandwidth of the frequency domain non-contiguous positioning reference signal.

22. The apparatus of claim 19 wherein a gap in the frequency domain non-contiguous positioning reference signal is greater than a threshold number of resource blocks.

23. An apparatus, comprising:
a memory;
at least one transceiver;
at least one processor communicatively coupled to the memory and the at least one transceiver and configured to:
receive a frequency domain non-contiguous positioning reference signal;
determine a bandwidth gap length of the frequency domain non-contiguous positioning reference signal;
perform a first time of arrival computation when the bandwidth gap length is less than a threshold value; and
perform a second time of arrival computation when the bandwidth gap length is greater than or equal to the threshold value.

24. The apparatus of claim 23 wherein the first time of arrival computation comprises a narrowband processing of the frequency domain non-contiguous positioning reference signal.

25. The apparatus of claim 24 wherein the narrowband processing includes performing one or more Inverse Fast Fourier Transforms on at least a portion of the frequency domain non-contiguous positioning reference signal.

26. The apparatus of claim 23 wherein the second time of arrival computation comprises a narrowband processing and a wideband processing of the frequency domain non-contiguous positioning reference signal.

27. The apparatus claim 26 wherein the wideband processing comprises setting a plurality of received frequency domain resources in a gap in the frequency domain non-contiguous positioning reference signal to a value of zero and performing an Inverse Fast Fourier Transform on the frequency domain non-contiguous positioning reference signal including the gap.

28. The apparatus of claim 23 wherein the frequency domain non-contiguous positioning reference signal includes two or more positioning reference signal resources of two separate positioning frequency layers.

* * * * *